J. H. WAGENHORST.
MEANS FOR EXPANDING AND CONTRACTING DEMOUNTABLE RIMS.
APPLICATION FILED AUG. 23, 1913.
1,230,543.
Patented June 19, 1917.
2 SHEETS—SHEET 1.
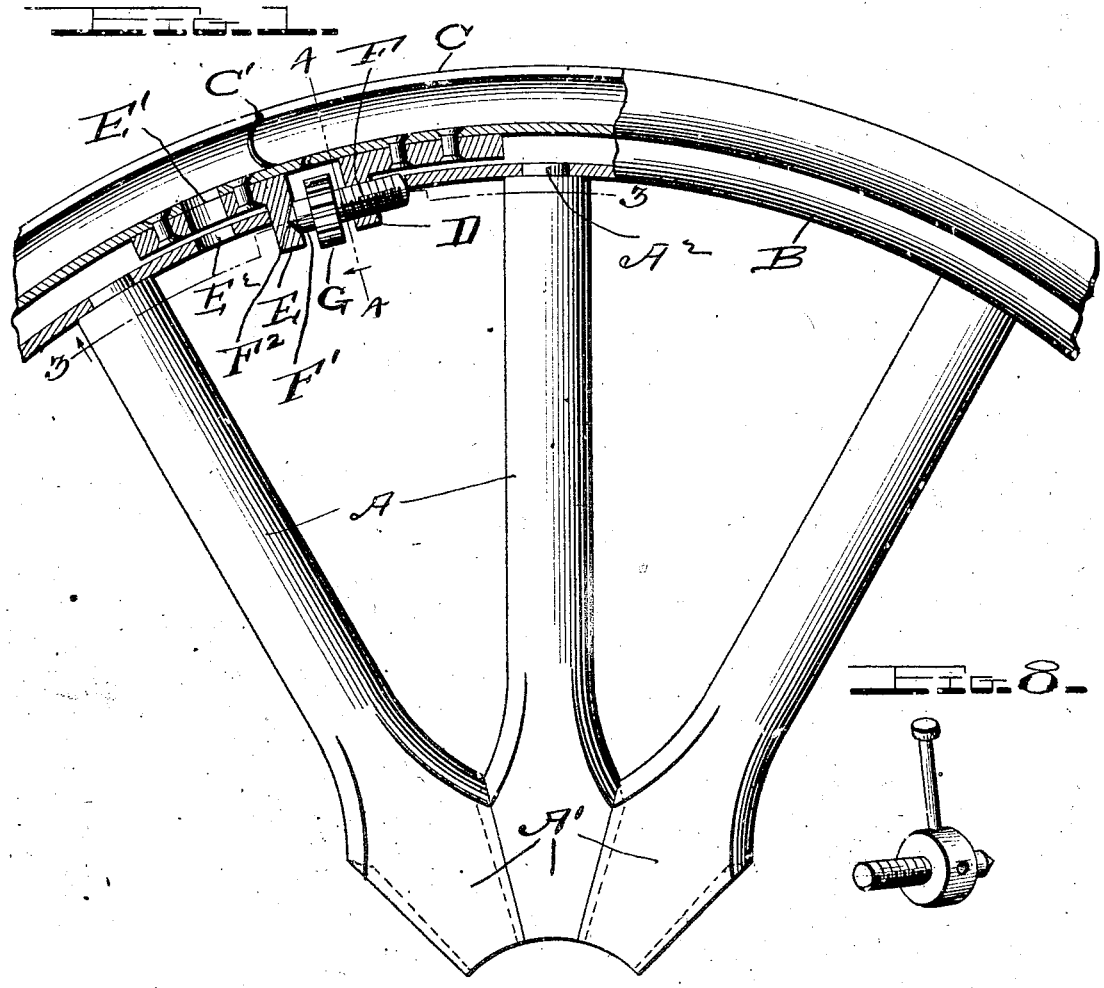
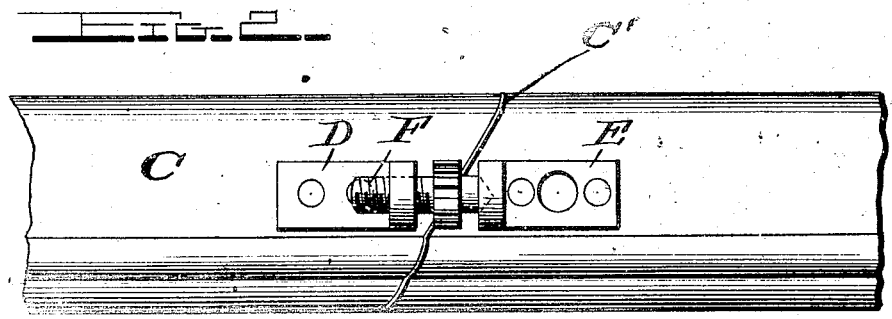
Witnesses
Chas. L. Griestauer.
E. B. McBath
Inventor
J. H. Wagenhorst,
By Chas. E. Brock
Attorney

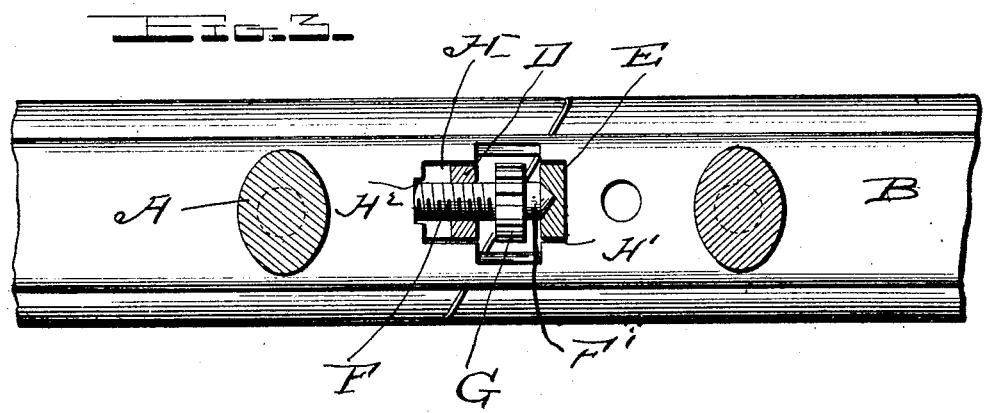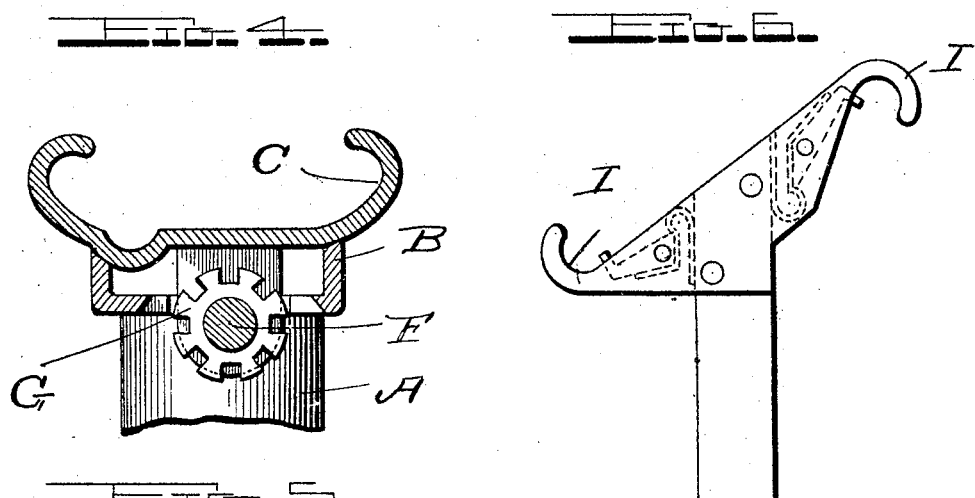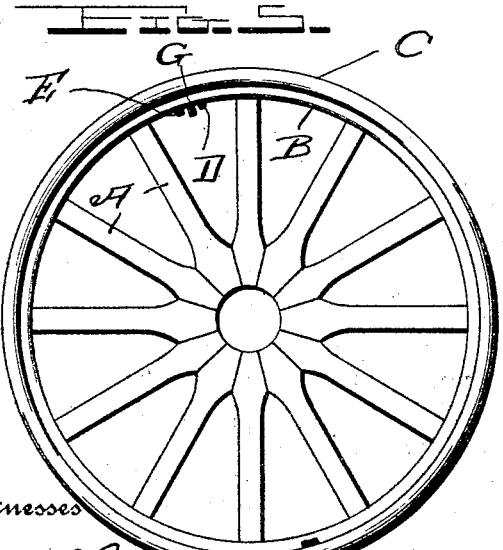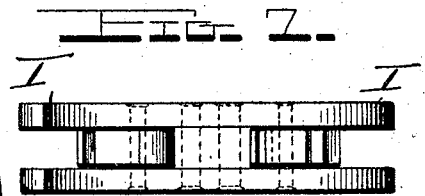

UNITED STATES PATENT OFFICE.

JAMES H. WAGENHORST, OF AKRON, OHIO.

MEANS FOR EXPANDING AND CONTRACTING DEMOUNTABLE RIMS.

1,230,543.  Specification of Letters Patent.  Patented June 19, 1917.

Application filed August 23, 1913. Serial No. 786,315.

*To all whom it may concern:*

Be it known that I, JAMES H. WAGENHORST, a citizen of the United States, residing at Akron, in the county of Summit and State of Ohio, have invented a new and useful Improvement in Means for Expanding and Contracting Demountable Rims, of which the following is a specification.

This invention relates generally to wheels and more particularly to automobile wheels and the special feature of the invention pertains to a demountable rim for use in connection with a wheel consisting of wooden spokes and a metal rim.

The object of the invention is to provide a split metal rim for use upon a continuous metal rim, said split rim being provided with an exceedingly simple and highly efficient means for quickly and easily expanding and contracting said rim so that it can be quickly and easily removed and replaced and locked upon the wheel.

Another object of the invention is to provide a demountable rim carrying means for expanding and contracting the same which means are adapted for coöperation with the metal rim upon which the split rim is mounted.

Another object of the invention is to provide a rim with fastening and unfastening means of such construction that the valve stem of the tire will not be disturbed during any of the manipulations of the rim expanding and contracting means.

With these various objects in view, my invention consists essentially in providing a divided rim with inwardly extending lugs adjacent the meeting edges of said rim, one of said lugs having a screw working therethrough and bearing upon the opposite lug, said lugs and screw being adapted to pass through an opening produced in the metal rim, the construction and arrangement of these parts being such that by turning the screw in one direction the divided rim will be expanded and by turning the screw in the opposite direction the rim will be contracted.

The invention consists also in the various features of construction, combination and arrangement of parts hereinafter described and pointed out in the claim.

In the drawings forming a part of this specification:—

Figure 1 is a view partly in section and partly in elevation illustrating the practical application of my invention to an automobile wheel embodying wooden spokes and a metallic rim.

Fig. 2 is a detail face view of a portion of the rim, together with the expanding and contracting means connected thereto, and, Fig. 3 is a similar view showing said rim arranged upon the metallic rim and also showing the coöperation of the rim and the rim expanding and contracting means, this view being a detail sectional view on the line 3—3 of Fig. 1.

Fig. 4 is a detail sectional view on the line 4—4 of Fig. 1.

Fig. 5 is a face view of a wheel embodying my improved construction.

Fig. 6 is a detail view of the wrench used in connection with the rim expanding and contracting means for operating the same.

Fig. 7 is an end view of the same, and,

Fig. 8 shows a modified form of turning means.

In the practical application of my invention I preferably employ a wheel comprising wooden spokes A having their inner ends A' made wedge-shaped and beveled alternately in opposite directions as fully described in my application for wheel filed of even date herewith. The outer ends of these spokes $A^2$ fit into a metallic rim B which may be of any desired cross-sectional shape or formation. The rim C is divided obliquely at C' and this metal rim may be of any desired cross sectional shape or form.

It will thus be understood that the rim may be made either for a clencher or straight sided tire and can be made to be used with a quick detachable rim if so desired.

The rim C is provided with inwardly extending lugs D and E adjacent the meeting edges, these lugs being preferably right-angular in shape and fastened to the underside of the rim by rivets, or they can be spot-welded or brazed or secured in any other suitable manner. The lug E has an opening E' which coincides with an opening $E^2$ produced in the rim for the purpose of permitting the passage of the valve stem of the tire. The lug D has a threaded opening produced therein in which works a screw F carrying a wheel G, the opposite end of this screw being devoid of threads and slightly tapered as shown at F' and seating in a tapered recess or socket $F^2$ produced in the adjacent face of the lug E. The opening H is produced in the rim B, said opening being of such size and shape as to receive the lugs D and E and screw F and also provide ample space for the insertion of the jaws I of the ratchet wrench hereinafter referred to.

It will be noted that the opening H at one end is shaped with a recessed portion H' to receive the lug E and at the opposite end is shaped with a recess H² to receive the end of the screw F. When the rim C is placed upon the rim B the lugs D and E will pass through the opening H, the lug E occupying the end H' while the end of the screw carried by the lug D will have its threaded end enter the end H² of the opening H. The smooth and tapered end of the screw will rest in the tapered recess of the lug E and the ratchet wheel G which is integral with the screw will rest between the lugs D and E.

It is obvious from this construction that by turning the screw in one direction the lugs will be caused to move toward each other contracting the rim and when turned in the opposite direction the lugs will be caused to separate thereby expanding the rim. The screw is held between the lug E and the opposite end of the felly opening and it is obvious that as the screw cannot move longitudinally the rotation of this screw will cause the lug D to travel back and forth upon the same and whereby the rim is expanded and contracted. When the screw has been turned so as to move the lug D toward the end H² of the opening H the rim is not only expanded but when the lug D has traveled as far as it can the extreme end of the screw is brought slightly away from the end H² and the rim can be quickly and easily demounted from the wheel. When the rim is replaced and the screw is turned in the opposite direction the lug D is caused to travel toward the lug E and thereby contracts the rim tightly upon the fixed rim B and at the completion of the operation the end of the screw is bearing forcibly against the end H² thereby serving to not only bind the rim upon the fixed rim B circumferentially but also provide a binding contact against the fixed rim B. The lug E remaining practically stationary during the manipulation the valve stem which passes through the openings E' and E² is not disturbed and the tire can be carried along with the rim when said rim is demounted.

For the purpose of quickly and easily manipulating the screw I provide not only the ratchet wheel G but also the double headed spring pawl ratchet I, one head being preferably arranged at a right angle to the handle while the other is arranged at an oblique angle to facilitate the manipulation of the wrench, it being understood to move the screw one head is applied to one side of the ratchet wheel and the handle worked back and forth to move the screw in one direction whereas by applying the other head of the wrench to the other side of the ratchet wheel and working the handle back and forth the screw will be moved in the opposite direction.

Instead of using a ratchet wheel and wrench I can provide the screw with an apertured boss G' into which a spike G² can be introduced for the purpose of turning the same. By reference to Fig. 8, it will be noted that I utilize the lug E as a convenient means for attaching the valve stem cover K and if desired other forms of covers may be employed not only for the valve stem but for the rim expanding and contracting means.

It will be noted that the screw is carried by one of the lugs connected to the rim and consequently the said screw is always in position for manipulation in the desired direction, and it is not necessary to remove this screw nor is it necessary to remove and reverse the other parts in order to effect all of the manipulations of the device.

It should also be noted that the movements of the screw are longitudinal or in line with the rim instead of being radial or at right angles to the rim.

It will also be noted that various forms of locking devices such as a latch or other device may be employed for locking the screw against reverse rotation.

In Fig. 5, I have illustrated a wheel provided with my improved rim expanding and contracting means and it will be noted that the rim is provided with a notch L directly opposite the opening H into which the screw driver or other convenient tool can be inserted for the purpose of assisting the demounting operation, it being understood that of course the wheel is turned so as to throw this notch uppermost.

From the above description, taken in connection with the accompanying drawings, it will be clearly understood that I provide an exceedingly simple and highly efficient means for expanding and contracting a demountable rim which is particularly adapted for use in connection with a metallic fixed rim but it will of course be understood that it can be used in connection with other forms of rims and it will also be understood that the details of construction can be varied or modified within definite limits without departing from the broad principle of my invention.

The lugs of the rim entering and resting within the opening in the fixed rim also serve to center or position the divided demountable rim upon the wheel and being locked in this position of course maintain the rim at all times properly centered or alined upon the wheel. This being another important and advantageous feature of my present construction.

What I claim is:—

The combination with a fixed rim having an opening therein, of a divided rim having inwardly extending lugs one of which is adapted to contact with the fixed rim at one end of the opening therein, the other lug being spaced from the opposite end of said opening, and a screw working through said lug one end of said screw bearing against the adjacent end of said opening in the fixed rim, the opposite end of said screw bearing against the other lug, said screw having a portion between the lugs for engagement with an operating tool.

JAMES H. WAGENHORST.

Witnesses:
CHAS. E. BROCK,
ELWOOD O. WAGENHORST.